United States Patent
Berrigan et al.

(10) Patent No.: US 9,556,541 B2
(45) Date of Patent: Jan. 31, 2017

(54) CURABLE FIBER

(75) Inventors: Michael R. Berrigan, Oakdale, MN (US); James G. Carlson, Lake Elmo, MN (US); Michael D. Crandall, North Oaks, MN (US); Clayton A. George, Afton, MN (US); Ignatius A. Kadoma, Cottage Grove, MN (US); Yong K. Wu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1098 days.

(21) Appl. No.: 13/141,482

(22) PCT Filed: Dec. 21, 2009

(86) PCT No.: PCT/US2009/068915
§ 371 (c)(1),
(2), (4) Date: Jun. 22, 2011

(87) PCT Pub. No.: WO2010/075248
PCT Pub. Date: Jul. 1, 2010

(65) Prior Publication Data
US 2011/0253366 A1    Oct. 20, 2011

Related U.S. Application Data

(60) Provisional application No. 61/140,360, filed on Dec. 23, 2008.

(51) Int. Cl.
*E21B 43/267* (2006.01)
*D01F 8/04* (2006.01)
*C09K 8/70* (2006.01)
*D06M 15/55* (2006.01)

(52) U.S. Cl.
CPC . *D01F 8/04* (2013.01); *C09K 8/70* (2013.01); *D06M 15/55* (2013.01); *C09K 2208/08* (2013.01); *Y10T 428/2929* (2015.01); *Y10T 428/2973* (2015.01)

(58) Field of Classification Search
CPC ........... E21B 43/267; E21B 43/26; C09K 8/80
USPC ........... 166/280.1, 280.2, 295; 428/370, 373, 428/374, 375, 291, 394, 395; 523/200
See application file for complete search history.

(56) References Cited

U.S. PATENT DOCUMENTS

| | | |
|---|---|---|
| 3,339,633 A | 9/1967 | Richardson |
| 3,419,073 A | 12/1968 | Brooks |
| 3,481,403 A | 12/1969 | Gidley |
| 3,968,088 A | 7/1976 | Asai |
| 4,256,828 A | 3/1981 | Smith |
| 4,406,850 A | 9/1983 | Hills |
| 4,622,155 A | 11/1986 | Harris |
| 4,745,148 A | 5/1988 | Chung |
| 4,863,646 A | 9/1989 | Watanabe |
| 5,006,611 A | 4/1991 | Schmid |
| 5,082,720 A | 1/1992 | Hayes |
| 5,089,536 A | 2/1992 | Palazzotto |
| 5,129,458 A | 7/1992 | King |
| 5,330,005 A | 7/1994 | Card |
| 5,411,693 A | 5/1995 | Wust, Jr. |
| 5,458,972 A | 10/1995 | Hagen |
| 5,501,275 A | 3/1996 | Card |
| 5,582,249 A | 12/1996 | Caveny |
| 5,591,199 A | 1/1997 | Porter |
| 5,618,479 A | 4/1997 | Lijten |
| 5,811,186 A * | 9/1998 | Martin et al. ................. 428/373 |
| 5,846,915 A | 12/1998 | Smith |
| 5,972,463 A | 10/1999 | Martin |
| 5,989,004 A | 11/1999 | Cook |
| 6,017,831 A | 1/2000 | Beardsley |
| 6,085,842 A | 7/2000 | Bossaerts |
| 6,172,011 B1 | 1/2001 | Card |
| 6,177,508 B1 | 1/2001 | Ohmori |
| 6,391,443 B1 | 5/2002 | Terada |
| 6,528,157 B1 | 3/2003 | Hussain |
| 6,732,800 B2 | 5/2004 | Acock |
| 6,848,519 B2 | 2/2005 | Reddy |
| 7,066,262 B2 | 6/2006 | Funkhouser |
| 7,371,701 B2 | 5/2008 | Inagaki |
| 2002/0048676 A1* | 4/2002 | McDaniel et al. ............ 428/404 |
| 2003/0230408 A1 | 12/2003 | Acock |
| 2004/0014608 A1* | 1/2004 | Nguyen et al. ............... 507/200 |
| 2004/0092191 A1 | 5/2004 | Bansal |

(Continued)

FOREIGN PATENT DOCUMENTS

| | | |
|---|---|---|
| CA | 2514311 | 2/2006 |
| EP | 0265221 | 4/1988 |
| EP | 0442700 | 8/1991 |
| EP | 0619415 | 10/1994 |
| EP | 771935 | 5/1997 |
| GB | 2431949 | 5/2007 |
| JP | 2001-98427 | 4/2001 |
| JP | 2003-193332 | 7/2003 |
| JP | 2004-115958 | 4/2004 |
| WO | WO 2007-010210 | 1/2007 |
| WO | WO 2007-050520 | 5/2007 |
| WO | WO 2007-066599 | 6/2007 |
| WO | WO 2009-079231 | 6/2009 |
| WO | WO 2009-079310 | 6/2009 |
| WO | WO 2010-075253 | 7/2010 |
| WO | WO 2010-075256 | 7/2010 |

OTHER PUBLICATIONS

International Search Report for PCT/US2009/068915, mailed Apr. 16, 2010, 4 pages.

*Primary Examiner* — Doug Hutton, Jr.
*Assistant Examiner* — Silvana Runyan

(57) ABSTRACT

Fibers comprising a first thermoplastic composition having a softening temperature up to 120° C and a curable resin. Also disclosed are compositions comprising a plurality of fibers, with some of the fibers comprising a first thermoplastic composition having a softening temperature up to 120° C and some of the fibers comprising a curable resin. The fibers have an aspect ratio of at least 2:1 and a maximum cross-sectional dimension up to 60 micrometers. Fluid compositions containing the fibers and methods of contacting a subterranean formation using the fibers are also disclosed.

20 Claims, 3 Drawing Sheets

(56) References Cited

U.S. PATENT DOCUMENTS

| | | |
|---|---|---|
| 2004/0194961 A1 | 10/2004 | Nguyen |
| 2005/0045330 A1 | 3/2005 | Nguyen |
| 2005/0194142 A1 | 9/2005 | Nguyen |
| 2005/0230027 A1 | 10/2005 | Kassa |
| 2005/0272611 A1 | 12/2005 | Lord |
| 2006/0032633 A1 | 2/2006 | Nguyen |
| 2006/0035790 A1* | 2/2006 | Okell et al. .................. 507/269 |
| 2006/0063457 A1 | 3/2006 | Matsui |
| 2006/0157243 A1* | 7/2006 | Nguyen ..................... 166/280.2 |
| 2007/0039300 A1* | 2/2007 | Kahlbaugh ........ B01D 39/2024 55/527 |
| 2007/0114022 A1 | 5/2007 | Nguyen |
| 2010/0092746 A1 | 4/2010 | Coant |
| 2010/0272994 A1* | 10/2010 | Carlson et al. ............... 428/401 |
| 2010/0288500 A1 | 11/2010 | Carlson |

\* cited by examiner

CURABLE FIBER

CROSS-REFERENCE TO RELATED APPLICATION

This application is a national stage filing under 35 U.S.C. 371 of PCT/US2009/068915, filed Dec. 21, 2009, which claims priority to U.S. Provisional Patent Application No. 61/140360, filed Dec. 23, 2008, the disclosure of which is incorporated by reference herein in its entirety.

BACKGROUND

Various multi-component fibers are known. Examples include fibers that have a low temperature melting or softening sheath covering a higher melting core. Multi-component structures may be useful, for example, for fiber bonding, wherein the sheath, for example, when melted or softened serves as a bonding agent for the core.

In the oil and gas industry, production of oil and/or gas is sometimes increased using hydraulic fracturing, which involves injecting a viscous fracturing fluid or a foam at high pressure into a subterranean well to form fractures. As the fracture is formed, a slurry of a particulate material, referred to as a "propping agent" or "proppant", in the fluid or foam is carried into the fracture. Upon release of the pressure, the proppants form a pack which serves to hold open the fractures, thus providing a highly conductive channel in the formation.

The efficacy of the hydraulic fracturing-fracture propping approach may be hindered by undesired transport of the proppant during clean-up operations or during production from the well. The transport of proppants, which is also known as flow-back, may restrict flow in the well bore, increase fluid friction, and contaminate produced fluids and therefore is undesirable.

Several different approaches have been used to address the problem of flow-back. Some fibers have been used in combination with proppants for flow-back control, and the modification of proppant geometry including the aspect ratio and particle size distribution has been investigated. Resin coated proppants have also been used. Resin coated proppants are expected to adhere to each other downhole to form an integrated proppant block. Different types of resin coatings have been used, including thermosetting resins (e.g., an epoxy or phenolic) and thermoplastic elastomers (e.g., acrylic resins). A disadvantage of resin coated proppants for proppant flow-back control is the potential premature curing of the proppant, and their required compatibility with the components of hydraulic fracture fluid (e.g., breakers) provides challenges.

Despite the advances in the technologies for flow-back control, there is a need for additional flow-back control options.

SUMMARY

The present disclosure provides, for example, fibers and compositions comprising a plurality of fibers. The fibers and the compositions comprise a first thermoplastic composition having a softening temperature up to 120° C. and a curable resin. The fibers and compositions disclosed herein may be useful, for example, for providing flow-back control in oil and gas well bores and reservoirs.

In one aspect, the present disclosure provides a fiber(s) comprising a first thermoplastic composition having a softening temperature up to 120° C. (in some embodiments, up to 110° C., 100° C., 95° C., 90° C., 85° C., 80° C., 75° C., or 70° C. or in a range from 60° C. to 80° C.) and a curable resin, the first thermoplastic composition and the curable resin each forming a portion of the fiber, wherein the fiber has an aspect ratio of at least 2:1, and wherein the fiber has a maximum cross-sectional dimension up to 60 micrometers (in some embodiments, up to 50, 40, or 30 micrometers; in some embodiments, in a range from 10 to 50 micrometers).

Exemplary embodiments of fibers described herein include those having a core and an exterior surface, the core comprising the first thermoplastic composition. In some of these embodiments, for example, the curable resin is exposed on at least a portion of the exterior surface. In some embodiments, for example, the fiber includes a core comprising the first thermoplastic composition and a sheath comprising the curable resin surrounding the core. In some of these embodiments, the sheath further comprises a curing agent.

In some embodiments, the fiber(s) according to the present disclosure comprises a core and a sheath surrounding the core, wherein the core comprises a second thermoplastic composition having a melting point of at least 140° C. (in some embodiments, at least 150° C.; in some embodiments, in a range from 140° C. to 260° C.), and wherein the sheath comprises the first thermoplastic composition having a softening point not greater than 120° C. and the curable resin.

In another aspect, the present disclosure provides a composition comprising a plurality of fibers according to any of the foregoing embodiments.

In another aspect, the present disclosure provides a composition comprising a plurality of fibers comprising:
thermoplastic fibers comprising a first thermoplastic composition having a softening temperature up to 120° C. (in some embodiments, up to 110° C., 100° C., 95° C., 90° C., 85° C., 80° C., 75° C., or 70° C. or in a range from 60° C. to 80° C.), wherein each thermoplastic fiber independently has an aspect ratio of at least 2:1 and a maximum cross-sectional dimension up to 60 micrometers (in some embodiments up to 50, 40, or 30 micrometers; in some embodiments in a range from 10 to 50 micrometers); and
curable fibers comprising a curable resin, wherein each curable fiber independently has an aspect ratio of at least 2:1 and a maximum cross-sectional dimension up to 60 micrometers (in some embodiments up to 50, 40, or 30 micrometers; in some embodiments in a range from 10 to 50 micrometers),
the thermoplastic fibers and the curable fibers each forming a portion of the plurality of fibers.

In some embodiments of compositions according to the present disclosure, each thermoplastic fiber and each curable fiber has a core and a sheath surrounding the core, wherein each core independently comprises a second thermoplastic composition having a melting point of at least 140 ° C. (in some embodiments, at least 150° C.; in some embodiments, in a range from 140° C. to 260° C.), wherein the sheath of the thermoplastic fiber comprises the first thermoplastic composition, and wherein the sheath of the curable fiber comprises the curable resin.

In some embodiments, the compositions disclosed herein further comprise a fluid, wherein the plurality of fibers is dispersed in the fluid. In some of these embodiments, the composition further comprises proppants dispersed in the fluid.

In another aspect, the present disclosure provides a method of treating a subterranean formation, the method comprising:

injecting into a well-bore intersecting the subterranean formation a fluid composition described herein;

exposing the first thermoplastic composition to at least one temperature above the softening point; and at least partially curing the curable resin. In some embodiments, exposing the first thermoplastic composition to at least one temperature above the softening point and at least partially curing the curable resin are subsequent to injecting the fluid composition.

Fibers described herein are useful, for example, for control of solids migration (e.g., proppant flow-back control) in wellbores and reservoirs. The fibers are also useful, and advantageous, for example, for maintaining proppant distribution during injection and placement in wellbores, as well as providing a more uniform proppant distribution in the fracture(s). Advantages of the fibers also include, in some embodiments, the ability to form a network in-situ by autogenous bonding, in addition to entanglement. Further, fibers described herein having polymeric and/or curable material on the outer portion of the fibers are less abrasive to equipment as compared, for example, to glass fibers.

BRIEF DESCRIPTION OF THE DRAWINGS

For a more complete understanding of the features and advantages of the present disclosure, reference is now made to the detailed description along with the accompanying figures and in which.

DETAILED DESCRIPTION

Fibers according to the present disclosure include a variety of cross-sectional shapes. Fibers described herein include those having at least one cross-sectional shape selected from the group consisting of circular, prismatic, cylindrical, lobed, rectangular, polygonal, or dog-boned. The fibers may be hollow or not hollow, and they may be straight or have an undulating shape. Differences in cross-sectional shape allow for control of active surface area, mechanical properties, and interaction with fluid or other components. In some embodiments, the fiber according to the present disclosure has a circular cross-section or a rectangular cross-section. Fibers having a generally rectangular cross-section shape are also typically known as ribbons. Fibers are useful, for example, because they provide large surface areas relative the volume they displace.

In some embodiments, fibers useful in practicing the present disclosure may have a single component (e.g., in embodiments of compositions comprising a plurality of fibers). In some embodiments of fibers disclosed herein comprising a first thermoplastic composition and a curable resin, the first thermoplastic composition and the curable resin may be present in the fiber in an admixture, for example, wherein the two components are uniformly mixed. In some embodiments, the fibers disclosed herein have the first thermoplastic composition, the curable resin, and optionally the second thermoplastic composition in separate regions of the fiber.

Figure 1A:
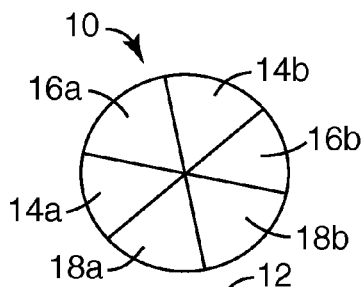
FIGS. 1A-1D are schematic cross-sections of four exemplary fibers described herein.
Figure 1B:
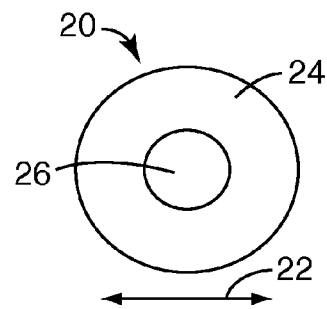
Figure 1C:
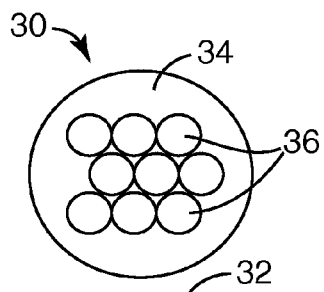
Figure 1D:
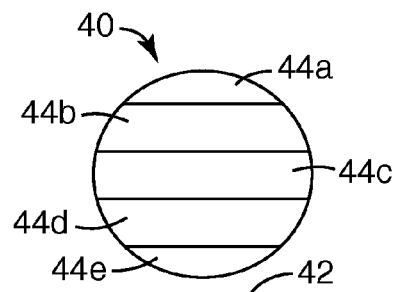

Exemplary embodiments of fibers described herein include those with cross-sections illustrated in FIGS. 1A-1D and 2A-2C. A core-sheath configuration, as shown in FIGS. 1B, 1C, and 2A-2C, may be useful, for example, because of the large surface area of the sheath. In these configurations, the surface of the fiber is typically made from a single composition. In embodiments wherein the sheath comprises the curable resin, the large curable surface area may be advantageous. It is within the scope of the present disclosure for the core-sheath configurations to have multiple sheaths, as shown, for example, in FIGS. 2B and 2C. Other configurations, for example, as shown in FIGS. 1A and 1D provide options that can be selected depending on the intended application. In the segmented pie wedge (see, e.g., FIG. 1A) and the layered (see, e.g., FIG. 1D) configurations, typically the surface is made from more than one composition.

Referring to FIG. 1A, a pie-wedge fiber 10 has a circular cross-section 12, a first thermoplastic composition having a softening temperature up to 120° C. located in regions 16a and 16b, and curable resin located in regions 14a and 14b. Other regions in the fiber (18a and 18b) may include a third component (e.g., a second thermoplastic composition having a melting point of at least 140° C.) or may independently include the first thermoplastic composition or the curable resin.

In FIG. 1B, fiber 20 has circular cross-section 22, sheath 24 of curable resin, and core 26 of a first thermoplastic composition having a softening temperature up to 120° C. It is also possible for core 26 to contain curable resin and sheath 24 to contain the first thermoplastic composition.

FIG. 1C shows fiber 30 having a circular cross-section 32 and a core-sheath structure with sheath 34 of curable resin and plurality of cores 36 of the first thermoplastic composition having a softening temperature up to 120° C. It is also possible for the plurality of cores 36 to contain curable resin and sheath 34 to contain the first thermoplastic composition.

FIG. 1D shows fiber 40 having circular cross-section 42, with five layered regions 44a, 44b, 44c, 44d, 44e, which comprise alternatively at least the first thermoplastic composition having a softening temperature up to 120° C. and a curable resin described herein. Optionally, the second thermoplastic composition may be included in at least one of the layers.

The exemplary cross-sections illustrated in FIGS. 1A-1D may also be useful for compositions according to the present disclosure that comprise a plurality of fibers including thermoplastic fibers and curable fibers. For example, each of the thermoplastic fibers and curable fibers may contain a second thermoplastic composition having a melting point of at least 140° C. For the thermoplastic fiber, the first and second thermoplastic compositions can be arranged in the pie-wedge configuration of FIG. 1A, the core-sheath configurations of FIGS. 1B or 1C, or the alternating configuration of FIG. 1D. For the curable fiber, the curable resin and the second thermoplastic composition can be arranged in the pie-wedge configuration of FIG. 1A, the core-sheath configurations of FIGS. 1B or 1C, or the alternating configuration of FIG. 1D.

Figure 2A:
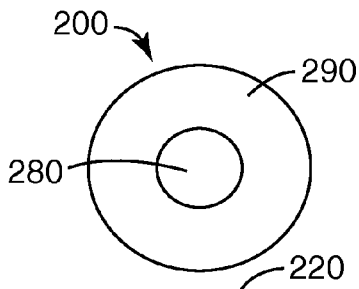
FIGS. 2A, 2B, and 2C are schematic cross-sections of three exemplary fibers described herein.
Figure 2B:
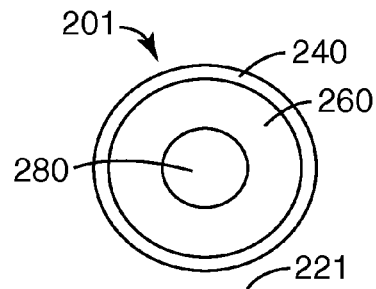
Figure 2C:
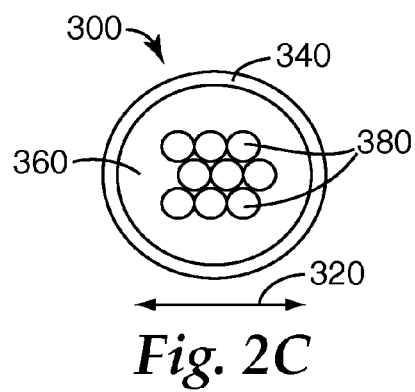

Other exemplary embodiments of fibers described herein include those illustrated in FIGS. 2A, 2B, and 2C. Referring to FIG. 2A, fiber 200 has circular cross-section 220, sheath 290 of the first thermoplastic composition having a softening temperature up to 120° C. and a curable resin, and core 280 of the second thermoplastic composition having a melting point of at least 140° C.

FIG. 2B shows fiber 201 having a circular cross-section 221, core 280 of the second thermoplastic composition, sheath 260 of the first thermoplastic composition, and second sheath 240 of the curable resin. In this embodiment, the curable resin is in a second sheath 240 surrounding the first thermoplastic composition in sheath 260.

FIG. 2C shows fiber 300 having a core-sheath structure with a circular cross-section 320, a sheath 360 of the first thermoplastic composition having a softening temperature up to 120° C., a second sheath 340 of curable resin, and multiple cores 380 of the second thermoplastic composition having a melting point of at least 140° C.

Figure 3A:
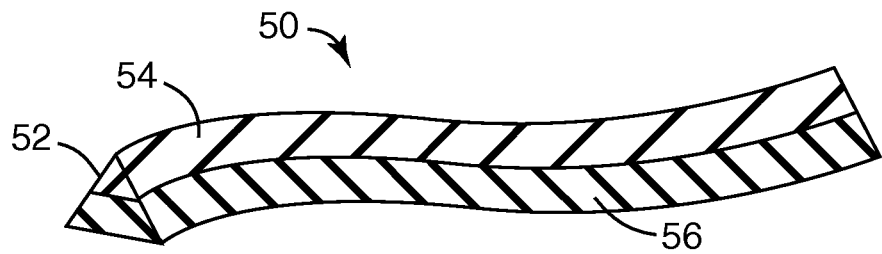
FIGS. 3A-3E are schematic perspective views of various fibers described herein.

FIGS. 3A-3E illustrate perspective views of various embodiments of fibers according to the present disclosure. FIG. 3A illustrates a fiber 50 having a triangular cross-section 52. In the illustrated embodiment, the first thermoplastic composition 54 exists in one region, and the curable resin 56 is positioned adjacent the first thermoplastic composition 54.

Figure 3B:
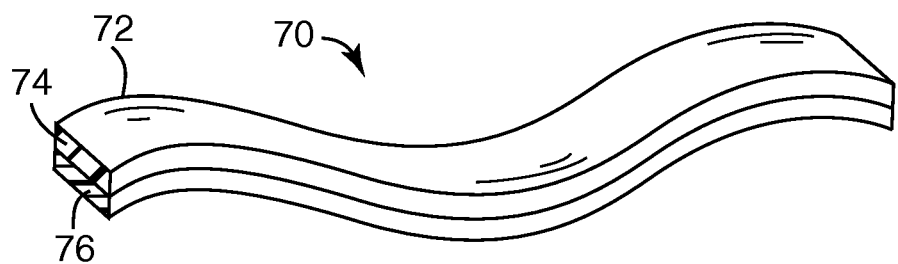

FIG. 3B illustrates a ribbon-shaped embodiment 70 having a generally rectangular cross-section and an undulating shape 72. In the illustrated embodiment, a first layer 74 comprises the first thermoplastic composition, while a second layer 76 comprises the curable resin.

Figure 3C:
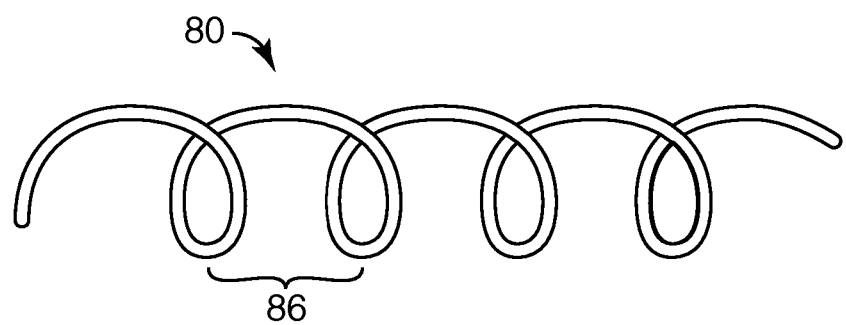

FIG. 3C illustrates a coiled or crimped fiber 80 according to the present disclosure. The distance between coils, 86, may be adjusted according to the properties desired.

Figure 3D:
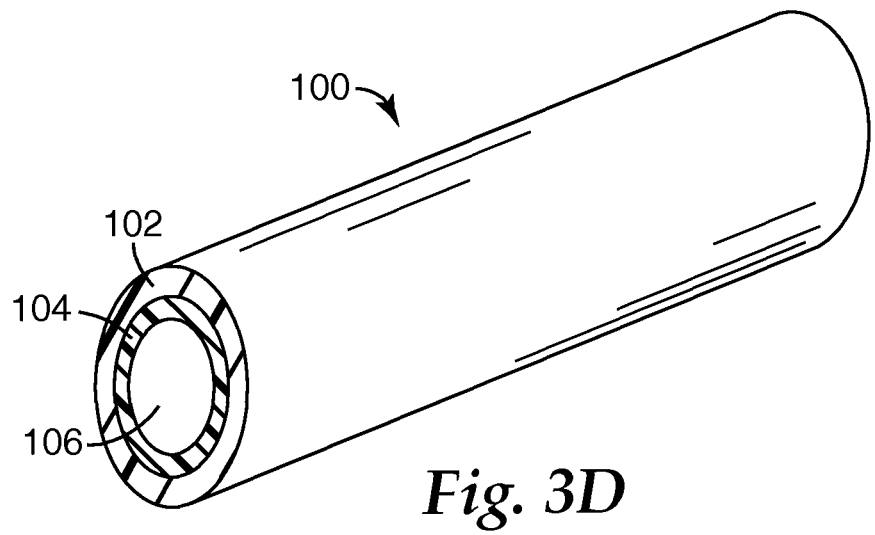

FIG. 3D illustrates a fiber 100 having a cylindrical shape, and having a first annular component 102, a second annular component 104, the latter component defining hollow core 106. The first and second annular components comprise the first thermoplastic composition and the curable resin in either combination. Or the second annular component 104 may comprise the second thermoplastic composition, and the first annular component 102 may comprise the first thermoplastic composition and the curable resin. The hollow core 106 may optionally be partially or fully filled with an additive (e.g., a curing agent or tackifier) for one of the annular components 102, 104.

Figure 3E:
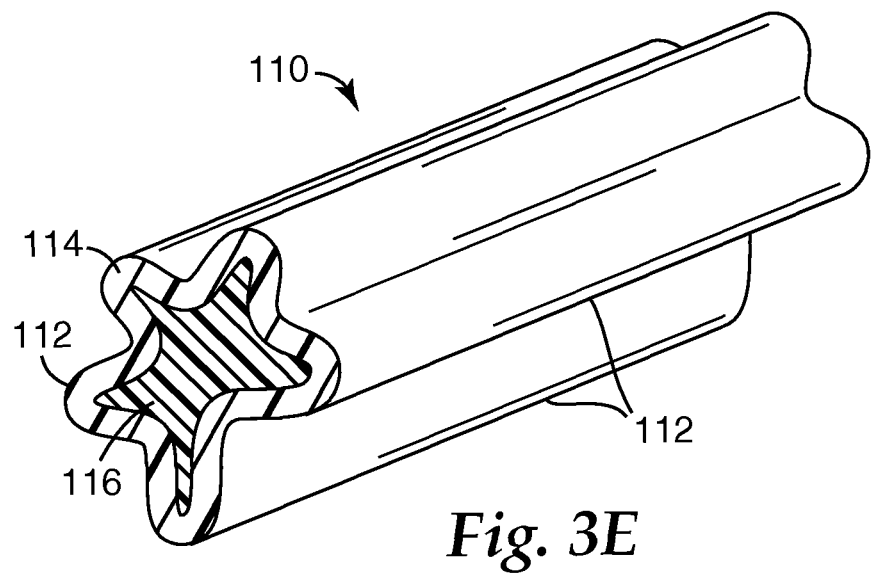

FIG. 3E illustrates a fiber with a lobed-structure 110, the example shown having five lobes 112 with outer portions 114 and an interior portion 116. The outer portions 114 and interior portion 116 comprise the first thermoplastic composition and the curable resin in either combination.

The aspect ratio of fibers described herein (e.g., fibers comprising a first thermoplastic composition, a curable resin, and optionally a second thermoplastic composition; thermoplastic fibers; and curable fibers described herein) may be, for example, at least 3:1, 4:1, 5:1, 10:1, 25:1, 50:1, 75:1, 100:1, 150:1, 200:1, 250:1, 500:1, 1000:1, or more; or in a range from 2:1 to 1000:1. Larger aspect ratios (e.g., having aspect ratios of 10:1 or more) may more easily allow the formation of a network and may allow for more fluid to pass through a proppant pack containing the fibers (i.e., may allow for higher conductivity of the proppant pack).

In some embodiments, fibers described herein (e.g., any of those with multiple components) are non-fusing up to at least 110° C. (in some embodiments, up to 120° C., 125° C., 150° C., or even up to 160° C.). "Non-fusing" fibers can autogenously bond (i.e., bond without the addition of pressure between fibers) without significant loss of architecture, for example, a core-sheath configuration. The spatial relationship between the first thermoplastic composition, the curable resin, and optionally the second thermoplastic composition is generally retained in non-fusing fibers. Typically multi-component fibers (e.g., fibers with a core-sheath configuration) undergo so much flow of the sheath composition during autogenous bonding that the core-sheath structure is lost as the sheath composition becomes concentrated at fiber junctions and the core composition is exposed elsewhere. That is, typically multi-component fibers are fusing fibers. This loss of structure typically results in the loss of the functionality of the fiber provided by the sheath component. In non-fusing fibers (e.g., core-sheath fibers) heat causes little or no flow of the sheath composition so that the sheath functionality is retained along the majority of the multi-component fibers.

To test whether fibers are non-fusing at a particular temperature, the following test is used. The fibers are cut to 6 mm lengths, separated, and formed into a flat tuft of interlocking fibers. The larger cross-sectional dimension (e.g., the diameter for a circular cross-section) of twenty of the cut and separated fibers is measured and the median recorded. The tufts of the fibers are heated in a conventional vented convection oven for 5 minutes at the selected test temperature. Twenty individual separate fibers are then selected and their larger cross-section dimension (e.g., diameter) measured and the median recorded. The fibers are designated as "non-fusing" if there is less than 20% change in the measured dimension after the heating.

Typically, fibers described herein exhibit at least one of (in some embodiments both) hydrocarbon or hydrolytic resistance. In some embodiments, when a 5 percent by weight mixture of the plurality of fibers in deionized water is heated at 145° C. for four hours in an autoclave, less than 50% by volume of the plurality of fibers at least one of dissolves or disintegrates, and less than 50% by volume of the first thermoplastic composition and the curable resin at least one of dissolves or disintegrates. Specifically, hydrolytic resistance is determined using the following procedure. One-half gram of fibers is placed into a 12 mL vial containing 10 grams of deionized water. The vial is nitrogen sparged, sealed with a rubber septum and placed in an autoclave at 145° C. for 4 hours. The fibers are then subjected to optical microscopic examination at 100× magnification. They are deemed to have failed the test if either at least 50 percent by volume of the fibers or at least 50 percent by volume of the first thermoplastic composition and the curable resin dissolved and/or disintegrated as determined by visual examination under the microscope.

In some embodiments, when a 2 percent weight to volume mixture of the plurality of fibers in kerosene is heated at 145° C. for 24 hours under nitrogen, less than 50% by volume of the plurality of fibers at least one of dissolves or disintegrates, and less than 50% by volume of the first thermoplastic composition and the curable resin at least one of dissolves or disintegrates. Specifically, hydrocarbon resistance is determined using the following procedure. One-half gram of fibers is placed into 25 mL of kerosene (reagent grade, boiling point 175-320° C., obtained from Sigma-Aldrich, Milwaukee, Wis.), and heated to 145° C. for 24 hours under nitrogen. After 24 hours, the kerosene is cooled, and the fibers are examined using optical microscopy at 100× magnification. They are deemed to have failed the test if either at least 50 percent by volume of the fibers or at least 50 percent by volume of the first thermoplastic composition and the curable resin dissolved and/or disintegrated as determined by visual examination under the microscope.

Embodiments of fibers described herein (e.g., fibers comprising a first thermoplastic composition, a curable resin, and optionally a second thermoplastic composition; thermoplastic fibers; and curable fibers described herein) include those having a length up to 20 mm, for example, in a range from 2 mm to 20 mm or 2 mm to 10 mm.

Fibers according to the present disclosure (e.g., fibers comprising a first thermoplastic composition, a curable resin, and optionally a second thermoplastic composition;

thermoplastic fibers; and curable fibers described herein) have a maximum cross-sectional dimension up to 60 (in some embodiments, up to 50, 40, or 30) micrometers. For example, the fiber may have a circular cross-section with an average diameter in a range from 1 micrometer to 60 micrometers, 10 micrometers to 50 micrometers, or 10 micrometers to 30 micrometers. In another example, the fiber may have a rectangular cross-section with an average length (i.e., longer cross-sectional dimension) in a range from 1 micrometer to 60 micrometers, 10 micrometers to 50 micrometers, or 10 micrometers to 30 micrometers.

Typically, the dimensions of the fibers used together for a particular application (e.g., in a plurality of fibers), and components making up the fibers are generally about the same, although use of fibers with even significant differences in compositions and/or dimensions may also be useful. In some applications, it may be desirable to use two or more different groups of fibers (e.g., at least one different polymer or resin, one or more additional polymers, different average lengths, or otherwise distinguishable constructions), where one group offers a certain advantage(s) in one aspect, and other group a certain advantage(s) in another aspect.

Fibers described herein can generally be made using techniques known in the art for making multi-component (e.g., bi-component) fibers. Such techniques include fiber spinning (see, e.g., U.S. Pat. Nos. 4,406,850 (Hills), 5,458, 972 (Hagen), 5,411,693 (Wust), 5,618,479 (Lijten), and 5,989,004 (Cook)).

Each component of the fibers, including the first thermoplastic composition, curable resin, and optionally the second thermoplastic composition and any additional polymers, can be selected to provide a desirable performance characteristic(s).

Fibers and compositions according to the present disclosure comprise a first thermoplastic composition having a softening temperature up to 120° C. (in some embodiments, up to 110° C., 100° C., 95° C., 90° C., 85° C., 80° C., 75° C., or 70° C. or in a range from 60° C. to 80° C.). For any of the embodiments of fibers or a plurality of fibers disclosed herein, the first thermoplastic composition may be a single thermoplastic material, a blend of thermoplastic materials, or a blend of at least one thermoplastic and at least one other (i.e., non-thermoplastic) material. The softening temperature of the first thermoplastic composition, advantageously, may be above the storage temperature of the fiber. The desired softening temperature can be achieved by selecting an appropriate single thermoplastic material or combining two or more thermoplastic materials. For example, if the thermoplastic material softens at too high of a temperature it can be decreased by adding a second thermoplastic with a lower softening temperature. Also, a thermoplastic material may be combined with, for example, a plasticizer to achieve the desired softening temperature. In some embodiments, the curable resin may be admixed with the thermoplastic material, and the resulting admixture has a softening temperature up to 120° C. (in some embodiments, up to 110° C., 100° C., 95° C., 90° C., 85° C., 80° C., 75° C., or 70° C. or in a range from 60° C. to 80° C.).

Exemplary thermoplastic materials that have or may be modified to have a softening temperature up to 120° C. (in some embodiments, not greater than 110° C., 100° C., 95° C., 90° C., 85° C., 80° C., 75° C., or 70° C. or in a range from 60° C. to 80° C.) include at least one of (i.e., includes one or more of the following in any combination) ethylene-vinyl alcohol copolymer (e.g., with softening temperature of 156 to 191° C., available from EVAL America, Houston, Tex., under the trade designation "EVAL G176B"), thermoplastic polyurethane (e.g., available from Huntsman, Houston, Tex., under the trade designation "IROGRAN A80 P4699"), polyoxymethylene (e.g., available from Ticona, Florence, Ky., under the trade designation "CELCON FG40U01"), polypropylene (e.g., available from Total, Paris, France, under the trade designation "5571"), polyolefins (e.g., available from ExxonMobil, Houston, Tex., under the trade designation "EXACT 8230"), ethylene-vinyl acetate copolymer (e.g., available from AT Plastics, Edmonton, Alberta, Canada), polyester (e.g., available from Evonik, Parsippany, N.J., under the trade designation "DYNAPOL" or from EMS-Chemie AG, Reichenauerstrasse, Switzerland, under the trade designation "GRILTEX"), polyamides (e.g., available from Arizona Chemical, Jacksonville, Fla., under the trade designation "UNIREZ 2662" or from E. I. du Pont de Nemours, Wilmington, Del., under the trade designation "ELVAMIDE 8660"), phenoxy (e.g., from Inchem, Rock Hill S.C.), vinyls (e.g., polyvinyl chloride form Omnia Plastica, Arsizio, Italy), or acrylics (e.g., from Arkema, Paris, France, under the trade designation "LOTADERAX 8900"). In some embodiments, the first thermoplastic composition comprises a partially neutralized ethylene-methacrylic acid copolymer commercially available, for example, from E. I. duPont de Nemours & Company, under the trade designations "SURLYN 8660," "SURLYN 1702," "SURLYN 1857," and "SURLYN 9520"). In some embodiments, the first thermoplastic composition comprises a mixture of a thermoplastic polyurethane obtained from Huntsman under the trade designation "IROGRAN A80 P4699", a polyoxymethylene obtained from Ticona under the trade designation "CELCON FG40U01", and a polyolefin obtained from ExxonMobil Chemical under the trade designation "EXACT 8230".

In some embodiments, including any of the embodiments of fibers or a plurality of fibers disclosed herein, the first thermoplastic material has a modulus of less than $3 \times 10^6$ dynes/cm$^2$ ($3 \times 10^5$ N/m$^2$) at a frequency of about 1 Hz at a temperature greater than −60° C. In these embodiments, typically the first thermoplastic composition is tacky at the temperature greater than −60° C.

Fibers and compositions according to the present disclosure comprise a curable resin (i.e., a thermosetting resin). The term "curable" as used herein refers to toughening or hardening of a resin by covalent crosslinking, brought about by at least one of chemical additives, electromagnetic radiation (e.g. visible, infrared or ultraviolet), e-beam radiation, or heat. Curable resins include low molecular weight materials, prepolymers, oligomers, and polymers, for example, having a molecular weight in a range from 500 to 5000 grams per mole. Useful curable resins include liquids and solids, for example, having a melting point of at least 50° C. (in some embodiments, at least 60° C., 70° C., or 80° C., in some embodiments, up to 100° C., 110° C., or 120° C.) . Exemplary curable resins include at least one of epoxy (e.g., available from Hexion Specialty Chemicals, Houston, Tex., under the trade designations "EPON 2004", "EPON 828", or "EPON 1004"), phenolic (e.g., available from Georgia Pacific, Atlanta, Ga.), acrylic, isocyanate (e.g., available from Bayer, Pittsburg, Pa.), phenoxy (e.g., available from Inchem Corp), vinyls, vinyl ethers, or silane (e.g., available from Dow-Corning, Midland, Mich.).

In some embodiments, including any of the embodiments of fibers or a plurality of fibers disclosed herein, the curable resin is an epoxy resin. Useful epoxy resins generally have, on the average, at least two epoxy groups per molecule. The "average" number of epoxy groups per molecule is defined as the number of epoxy groups in the epoxy-containing material divided by the total number of epoxy molecules present. In some embodiments of fibers or a plurality of fibers disclosed herein, the curable resin is a solid epoxy resin. Suitable epoxy resins include the diglycidyl ether of Bisphenol A (e.g., those available from Hexion Specialty Chemicals under the trade designations "EPON 828", "EPON 1004", and "EPON 1001F" and from Dow Chemical Co., Midland, Mich. under the trade designations "D.E.R. 332" and "D.E.R. 334"), the diglycidyl ether of Bisphenol F (e.g., available from Huntsman Chemical, The Woodlands, Tex., under the trade designation "ARALDITE GY28 1"), cycloaliphatic epoxies (e.g., vinylcyclohexene dioxide, 3,4-epoxycyclohexylmethyl-3,4-epoxycyclohexene carboxylate, 2-(3,4-epoxycylohexyl-5,5-spiro-3,4-epoxy) cyclohexane-metadioxane, bis(3, 4-epoxycyclohexyl) adipate, and those available from Dow Chemical Co. under the trade designation "ERL"); epoxidized polybutadiene; silicone resin containing epoxy functionality, flame retardant epoxy resins (e.g., a brominated bisphenol type epoxy resin available, for example, from Dow Chemical Co. under the trade designation "D. E. R. 542"), 1,4-butanediol diglycidyl ether (e.g., available from Huntsman Chemical under the trade designation "ARALDITE RD-2"), diglycidyl ethers of polyoxyalkylene glycols, hydrogenated bisphenol A-epichlorohydrin based epoxy resins (e.g., available from Hexion Specialty Chemicals under the trade designation "EPONEX 1510"), polyglycidyl ether of phenolformaldehyde novolak (e.g., available from Dow Chemical Co. under the trade designation "D.E.N. 431" and "D.E.N. 438"), and glycidyl methacrylate polymers or copolymers.

Embodiments of fibers described herein include those comprising a curing agent. The term "curing agent" refers to both reactive multifunctional materials that copolymerize with the curable resin (e.g., by addition polymerization) and components that cause the homopolymerization of the curable resin. Some curing agents may both copolymerize with curable resins and cause their homopolymerization, depending on the temperature and other conditions. In some embodiments, the curing agent is present, for example, with the curable resin and/or the first thermoplastic composition described herein. In some embodiments, the first thermoplastic composition comprises a curing agent. In some of these embodiments, the first thermoplastic composition is formulated with, for example, a photoinitiator or catalyst that can cure the curable resin. In some embodiments, the first thermoplastic composition includes a thermoplastic with functional groups (e.g., acidic or basic functional groups) that can react with or cause the homopolymerization of the curable resin. In some of these embodiments, the first thermoplastic composition includes a polyurethane. In other of these embodiments, the first thermoplastic composition includes an ethylene methacrylic acid co-polymer.

Exemplary curing agents (e.g., for epoxy resins) include aromatic amines (e.g., 4,4' methylene dianiline or an aromatic amine available, for example, from Air Products, Allentown, Pa., under the trade designation "AMICURE 101"); aliphatic amines (e.g., diethethylenetriamine, aminoethylpiperazine, or tetraethylenepentamine); modified aliphatic amines (e.g., those available from Air Products under the trade designations "ANCAMINE XT" or "ANCAMINE 1768"); cycloaliphatic amines (e.g. those available from Air Products under the trade designations "ANCAMINE 1618" or "ANCAMINE 1895"; modified polyether amines (e.g., those available from Huntsman Chemical, The Woodlands, Tex., under the trade designation "JEFFAMINE"); amidoamines (e.g., those available from Air Products under the trade designations "ANCAMIDE 506", " ANCAMIDE 2386", or " ANCAMIDE 2426"); polyamides (e.g., those available from Air Products under the trade designations "ANCAMIDE 220", "ANCAMIDE 260A", and "ANCAMIDE 400"); tertiary amines (e.g., those available from Air Products under the trade designations "ANCAMINE 1110" and "ANCAMINE K54"); dicyandiamide; substituted ureas (e.g., those available from Air Products under the trade designations "AMICURE UR" and " AMICURE UR2T"; imidiazoles (e.g., those available from Shikoku Chemicals Corporation, Marugame, Kagawa, Japan under the trade designations "CUREZOL 2MA-OK" and "CUREZOL 2PZ"; boron trifluoride monoethylamine; quaternary phosphoneium salts; urethanes, anhydrides (e.g., maleic anhydride and succinic anhydride); carboxylic acids; polysulfides; and mercaptans (e.g., those available from Cognis Corporation, Monheim, Germany, under the trade designation "CAPCURE WR-6". In some embodiments, the curing agent is a photoinitiator. Exemplary photoinitiators include aromatic iodonium complex salts (e.g., diaryliodonium hexafluorophosphate, diaryliodonium hexafluoroantimonate, and others described in U.S. Pat. No. 4,256,828 (Smith)); aromatic sulfonium complex salts (e.g., triphenylsulfonium hexafluoroantimonate and others described in U.S. Pat. No. 4,256,828 (Smith)); and metallocene salts (e.g., ($\eta^5$-cyclopentadienyl)$\eta^6$-xylenes)Fe$^+$SbF$_6^-$ and others described in U.S. Pat. No. 5,089,536 (Palazzotto). In some embodiments, the curing agent is selected from the group consisting of amines, urethanes, ureas, amides, carboxylic acids, and imidazole. The curing agent may be present in the fiber (e.g., with the curable resin or with the first thermoplastic composition) in a range from 0.1 to 40 percent by weight based on the amount of the curable resin, depending on the curing agent selected (e.g., whether it is a catalytic or stochiometric curing agent). In some embodiments (e.g., embodiments wherein the first thermoplastic composition includes a thermoplastic that is a curing agent) the weight of the curing agent can exceed the weight of the curable resin. Generally, the curing agent is present in a sufficient amount to cause the curable resin (including any thermoplastic with which it is combined) to reach its gel point (i.e., the time or temperature at which a cross-linked, three-dimensional network begins to form).

Curable resins described herein can be cured using techniques known in the art, including through electromagnetic radiation (e.g. visible, infrared, or ultraviolet), e-beam radiation, heat, or a combination thereof. In some embodiments where a photoinitiator is a curing agent for the curable resin, the fiber may be exposed to light and then exposed to heat (e.g., when the fiber is injected into a subterranean formation).

In some embodiments, the curable resin, in combination with any curative and/or accelerator, has an cure onset temperature of up to 120° C. (in some embodiments, up to 110° C., 100° C., 95° C., 90° C., 85° C., 80° C., 75° C., or 70° C. or in a range from 60° C. to 80° C.).

Exemplary second thermoplastic compositions having a melting point of at least 140° C. (in some embodiments, at least 150° C.; in some embodiments, in a range from 160° C. to 220° C.) useful for practicing some embodiments of the present disclosure include at least one of (i.e., includes one or more of the following in any combination) an ethylene-vinyl alcohol copolymer (e.g., available from EVAL America, Houston, Tex., under the trade designation "EVAL G176B"), polyamide (e.g., available from E. I. du Pont de Nemours under the trade designation "ELVAMIDE" or from BASF North America, Florham Park, N.J., under the trade designation "ULTRAMID"), polyoxymethylene (e.g., available from Ticona under the trade designation "CELCON"), polypropylene (e.g., from Total), polyester (e.g., available from Evonik under the trade designation "DYNAPOL" or from EMS-Chemie AG under the trade designation "GRIL-TEX"), polyurethane (e.g., available from Huntsman under the trade designation "IROGRAN"), polysulfone, polyimide, polyetheretherketone, or polycarbonate. As described above for the first thermoplastic compositions, blends of thermoplastics and/or other components can be used to make the second thermoplastic compositions. For example, if the core thermoplastic flows at too low of a temperature it can be modified by adding a second polymer with a higher flow temperature. In some embodiments, the second thermoplastic composition is present in a range from 5 to 40 percent by weight, based on the total weight of the fiber.

Fibers, including fibers including the first thermoplastic composition and optionally the second thermoplastic composition, described herein may, for example, comprise at least 30, 40, 50, 60, 70, or at least 98 (in some embodiments, in a range from 30 to 60) percent by weight thermoplastic (e.g., including the first thermoplastic composition, optionally the second thermoplastic composition, and any other thermoplastics), based on the total weight of the respective fiber. In some embodiments, fibers described herein may, for example, comprise in a range from 5 to 85 (in some embodiments, 5 to 40, 40 to 70, or 60 to 70) percent by weight of the first thermoplastic composition having a softening temperature up to 120° C. (in some embodiments, up to 110° C., 100° C., 95° C., 90° C., 85° C., 80° C., 75° C., or 70° C. or in a range from 60° C. to 80° C.), based on the total weight of the respective fiber.

In some embodiments (e.g., in embodiments comprising the first thermoplastic composition and optionally the second thermoplastic composition) of the fibers according to the present disclosure have the curable resin present in a range from 20 to 60 percent by weight, based on the total weight of the fiber.

In some embodiments of the fibers described herein, including embodiments comprising the second thermoplastic composition, the thermoplastic having a softening temperature up to 120° C. (in some embodiments, up to 110° C., 100° C., 95° C., 90° C., 85° C., 80° C., 75° C., or 70° C. or in a range from 60° C. to 80° C.) and the curable resin may, for example, collectively comprise at least 25 (in some embodiments, at least 30, 40, 50, 60, 70, 75, 80, 90, 95, or 98) percent by weight of the respective fiber.

In some embodiments of compositions according to the present disclosure, thermoplastic fibers described herein may, for example, each comprise at least 30, 40, 50, 60, 70, or even at least 98 (in some embodiments, in a range from 30 to 60) percent by weight thermoplastic (e.g., including the first thermoplastic composition, optionally the second thermoplastic composition, and any other thermoplastics), based on the total weight of the respective thermoplastic fiber. Thermoplastic fibers described herein may, for example, comprise in a range from 5 to 85 (in some embodiments, 5 to 40, 40 to 70, or 60 to 70) percent by weight of the thermoplastic having a softening temperature up to 120° C. (in some embodiments, not greater than 110° C., 100° C., 95° C., 90° C., 85° C., 80° C., 75° C., or 70° C. or in a range from 60° C. to 80° C.), based on the total weight of the respective thermoplastic fiber.

Curable fibers described herein may, for example, have the curable resin present in a range from 20 to 60 percent by weight, based on the total weight of the respective curable fiber.

Optionally, fibers described herein may further comprise other components (e.g., additives and/or coatings) to impart desirable properties such as handling, processability, stability, and dispersability and to improve performance when dispersed in a fluid. Exemplary additives and coating materials include antioxidants, colorants (e.g., dyes and pigments), fillers (e.g., carbon black, clays, and silica), and surface applied materials (e.g., waxes, surfactants, polymeric dispersing agents, talcs, erucamide, gums, and flow control agents) to improve handling.

Surfactants can be used to improve the dispersibility of fibers described herein, for example, in compositions (e.g., comprising a fluid) according to the present disclosure. Useful surfactants (also known as emulsifiers) include anionic, cationic, amphoteric, and nonionic surfactants. Useful anionic surfactants include alkylarylether sulfates and sulfonates, alkylarylpolyether sulfates and sulfonates (e.g., alkylarylpoly(ethylene oxide) sulfates and sulfonates, preferably those having up to about 4 ethyleneoxy repeat units, including sodium alkylaryl polyether sulfonates such as those known under the trade designation "TRITON X200", available from Rohm and Haas, Philadelphia, Pa.), alkyl sulfates and sulfonates (e.g., sodium lauryl sulfate, ammonium lauryl sulfate, triethanolamine lauryl sulfate, and sodium hexadecyl sulfate), alkylaryl sulfates and sulfonates (e.g., sodium dodecylbenzene sulfate and sodium dodecylbenzene sulfonate), alkyl ether sulfates and sulfonates (e.g., ammonium lauryl ether sulfate), and alkylpolyether sulfate and sulfonates (e.g., alkyl poly(ethylene oxide) sulfates and sulfonates, preferably those having up to about 4 ethyleneoxy units). Useful nonionic surfactants include ethoxylated oleoyl alcohol and polyoxyethylene octylphenyl ether. Useful cationic surfactants include mixtures of alkyl dimethylbenzyl ammonium chlorides, wherein the alkyl chain has from 10 to 18 carbon atoms. Amphoteric surfactants are also useful and include sulfobetaines, N-alkylaminopropionic acids, and N-alkylbetaines. Surfactants may be added to the fibers disclosed herein, for example, in an amount sufficient on average to make a monolayer coating over the surfaces of the fibers to induce spontaneous wetting. Useful amounts of surfactants may be in a range, for example, from 0.05 to 3 percent by weight, based on the total weight of the fiber.

Polymeric dispersing agents may also be used, for example, to promote the dispersion of fibers described herein in the chosen medium, and at the desired application conditions (e.g., pH and temperature). Exemplary polymeric dispersing agents include salts (e.g., ammonium, sodium, lithium, and potassium) of polyacrylic acids of greater than 5000 average molecular weight, carboxy modified polyacrylamides (available, for example, under the trade designation "CYANAMER A-370" from Cytec Industries, West Paterson, N.J.), copolymers of acrylic acid and dimethylaminoethylmethacrylate, polymeric quaternary amines (e.g., a quaternized polyvinyl-pyrollidone copolymer (available, for example, under the trade designation "GAFQUAT 755" from ISP Corp., Wayne, N.J.) and a quaternized amine substituted cellulosic (available, for example, under the trade designation "JR-400" from Dow Chemical Company, Midland, MI), cellulosics, carboxy-modified cellulosics (e.g., sodium carboxy methylcellulose (available, for example, under the trade designation ""NATROSOL CMC Type 7L⇆ from Hercules, Wilmington, Del.), and polyvinyl alcohols. Polymeric dispersing agents may be added to the fibers disclosed herein, for example, in an amount sufficient on average to make a monolayer coating over the surfaces of the fibers to induce spontaneous wetting. Useful amounts of polymeric dispersing agents may be in a range, for example, from 0.05 to 5 percent by weight, based on the total weight of the fiber.

Examples of antioxidants include hindered phenols (available, for example, under the trade designation "IRGANOX" from Ciba Specialty Chemical, Basel, Switzerland). Typically, antioxidants are used in a range from 0.1 to 1.5 percent by weight, based on the total weight of the fiber, to retain useful properties during extrusion and through the life of the article.

In some embodiments, compositions according to the present disclosure comprise a fluid having a plurality of the fibers disclosed herein dispersed in the fluid. The compositions may be aqueous, non-aqueous (e.g., comprising hydrocarbon or alcohol), or a combination thereof, and may optionally comprise one or more surfactants (e.g., those surfactants listed above), viscosity modifiers (e.g., gelling agents and breakers), gases (e.g., nitrogen, carbon dioxide, air, and natural gas), buffers, or salts. The pH of the composition may be adjusted to be compatibility with the fibers disclosed herein.

In some embodiments, compositions according to the present disclosure comprise proppants (e.g., dispersed in the fluid). The term "proppant" as used herein includes fracture proppant materials introducible into the formation as part of a hydraulic fracture treatment and sand control particulate introducible into the wellbore/formation as part of a sand control treatment such as a gravel pack or frac pack. Exemplary proppants known in the art include those made of sand (e.g., Ottawa, Brady or Colorado Sands, often referred to as white and brown sands having various ratios), resin-coated sand, sintered bauxite, ceramics (i.e., glasses, crystalline ceramics, glass-ceramics, and combinations thereof), thermoplastics, organic materials (e.g., ground or crushed nut shells, seed shells, fruit pits, and processed wood), and clay. Sand proppants are available, for example, from Badger Mining Corp., Berlin, Wis.; Borden Chemical, Columbus, Ohio; and Fairmont Minerals, Chardon, Ohio. Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics; and Saint Gobain. Glass bubble and bead proppants are available, for example, from Diversified Industries, Sidney, British Columbia, Canada; and 3M Company.

Useful proppants have sizes, for example, in a range from 100 micrometers to 3000 micrometers (i.e., about 140 mesh to about 5 mesh (ANSI)) (in some embodiments, in a range from 1000 micrometers to 3000 micrometers, 1000 micrometers to 2000 micrometers, 1000 micrometers to 1700 micrometers (i.e., about 18 mesh to about 12 mesh), 850 micrometers to 1700 micrometers (i.e., about 20 mesh to about 12 mesh), 850 micrometers to 1200 micrometers (i.e., about 20 mesh to about 16 mesh), 600 micrometers to 1200 micrometers (i.e., about 30 mesh to about 16 mesh), 425 micrometers to 850 micrometers (i.e., about 40 to about 20 mesh), or 300 micrometers to 600 micrometers (i.e., about 50 mesh to about 30 mesh).

In some embodiments of methods of treating a subterranean formation disclosed herein, the method comprises injecting into a wellbore intersecting the subterranean formation a composition comprising a plurality of fibers disclosed herein (e.g., the plurality of fibers comprising a first thermoplastic composition, a curable resin, and optionally a second thermoplastic composition). In some embodiments of the methods disclosed herein, the method comprises injecting into a well-bore intersecting the subterranean formation a composition comprising a plurality of fibers, the plurality of fibers comprising thermoplastic fibers and curable fibers disclosed herein.

In some embodiments of the methods of treating a subterranean formation disclosed herein, the method comprises forming a network of the plurality of fibers. The network may be formed, for example, by exposing the first thermoplastic composition to at least one temperature above the softening temperature. Above the softening temperature, for example, at the temperature of the subterranean formation, the first thermoplastic composition will become tacky (i.e., have a modulus of less than $3\times10^6$ dynes/cm$^2$ ($3\times10^5$ N/m$^2$) at a frequency of about 1 Hz), and the fibers can adhere to each other to form a network. In some embodiments, the first thermoplastic composition is designed to be tacky at a specific downhole temperature (e.g., the bottomhole static temperature (BHST). The tacky network may be formed almost instantaneously when the fibers reach their desired position in the formation, providing the possibility of quick control of solids migration (e.g., flow-back control).

In the methods of treating a subterranean formation disclosed herein, the curable resin is at least partially cured. At least partial curing may occur, for example, when at least 50 (in some embodiments, at least 60, 70, 75, 80, 90, 95, or 97) percent of the reactive functional groups in the curable resin are reacted. Without wanting to be bound by theory, it is believed that as the curable resin cures and develops its strength, it will reinforce any tacky network formed between the fibers. In some embodiments, the thermoplastic present with the cured resin can toughen the consolidated proppant or gravel pack. The pack, therefore, may be resistant to cyclic stress, which may result from frequent shutdown and restart of wells.

In some embodiments of the fibers and methods disclosed herein, the onset temperature of the cure of the curable resin is about the same as the softening temperature of the first thermoplastic composition (e.g., within 20, 15, 10, or 5° C.). In some of these embodiments, the first thermoplastic composition comprises a curing agent for the curable resin, which may be advantageous, for example, for preventing curing of the resin before it is placed in the desired location in the subterranean formation.

In some embodiments of the methods disclosed herein, wherein the plurality of fibers comprises the second thermoplastic composition, the second thermoplastic composition has melting point that is higher than the temperature in the subterranean formation. For example, the melting point may be at least 10, 15, 20, 25, 50, 75, or at least 100° C. above the temperature in the formation.

In some embodiments of the methods of treating a subterranean formation disclosed herein, the fibers are supplied into the wellbore as dry fibers.

Methods of treating a subterranean formation according to the present disclosure may be useful, for example, for reducing migration of solids in subterranean formations. Applications for the methods disclosed herein include fracturing, gravel packing, and fines control (e.g., fines spalled or eroded from the surface of subterranean rock). In some embodiments of methods of treating a subterranean formation disclosed herein, injecting is carried out at a pressure high enough to open at least one fracture in the formation. In some embodiments, the injected composition contains an acid (e.g., hydrochloric acid). In some embodiments, the method further comprises contacting the fracture with the composition. In some of these embodiments, the method further comprises placing proppant in the fracture. The methods disclosed herein include injecting the compositions comprising a plurality of fibers disclosed herein during or after fracturing the formation.

Methods according to the present disclosure can be used in vertical wells, deviated wells, inclined wells or horizontal wells and may be useful for oil wells, gas wells, and combinations thereof.

Typically, when the methods described herein are used in a fracturing operation with a proppant, the plurality of fibers according to the present disclosure prevent flow-back of the proppant during clean-up operations or during production. Flow-back control may be evaluated in a laboratory, for example, using an assembly of a flow-back cell for containing a proppant pack with inlets and an outlet allowing the flow of fluid, a circulation system for pumping fluid through the proppant pack, and a hydraulic press for providing uniaxial closure stress onto the proppant pack. Fluid (e.g., water) can be pumped from the upstream side of the cell at increasing flow rates until part of the proppant pack is observed to flow into the outlet. In some embodiments, the evaluation is carried out with the following specifications. The flow-back cell is a rectangular body with a 5.25 inch by 5.25 inch (13.3 cm by 13.3 cm) working area for holding 400 grams of solid (e.g., sand proppant plus fibers disclosed herein). After the solid is introduced into the body, a square piston is inserted on top of the solid. On the upstream side of the cell, there are three 13 mm inlets for the inflow of water. On the discharge side of the cell, there is a 10 mm outlet. The flow-back cell is then placed in the hydraulic press, and a closure stress of 4000 psi (27.6 MPa) is applied. The flow-back cell is held at a temperature of 90° C., and the flow of water is continuously increased from zero at a rate of 4 liters/minute until the proppant pack fails. In some embodiments, the plurality of fibers disclosed herein provide an unexpectedly high flow rate at failure (e.g., at least 6, 8, 10, or 12 liters per minute).

Selected Embodiments Of The Disclosure

In a first embodiment, the present disclosure provides a fiber comprising:
  a first thermoplastic composition having a softening temperature up to 120° C., and
  a curable resin,
the first thermoplastic composition and the curable resin each forming a portion of the fiber, wherein the fiber has an aspect ratio of at least 2:1, and wherein the fiber has a maximum cross-sectional dimension up to 60 micrometers.

In a second embodiment, the present disclosure provides the fiber according to the first embodiment, wherein the fiber comprises at least a core and an exterior surface, wherein the core comprises the first thermoplastic composition, and wherein the curable resin is exposed on at least a portion of the exterior surface.

In a third embodiment, the present disclosure provides the fiber according to embodiment 1 or 2, wherein the fiber comprises a core comprising the first thermoplastic composition and a sheath comprising the curable resin surrounding the core.

In a fourth embodiment, the present disclosure provides the fiber according to embodiment 1, comprising a core and a sheath surrounding the core, wherein the core comprises a second thermoplastic composition having a melting point of at least 140° C., and wherein the sheath comprises the first thermoplastic composition having a softening temperature up to 120° C. and the curable resin.

In a fifth embodiment, the present disclosure provides the fiber according to embodiment 4, wherein the second thermoplastic composition comprises at least one of an ethylene-vinyl alcohol copolymer, polyamide, polyoxymethylene, polypropylene, polyester, polyurethane, polysulfone, polyimide, polyetheretherketone, or polycarbonate.

In a sixth embodiment, the present disclosure provides the fiber according to any one of embodiments 3 to 5, wherein the sheath further comprises a curing agent.

In a seventh embodiment, the present disclosure provides the fiber according to any preceding embodiment comprising at least 30 percent by weight thermoplastic, based on the total weight of the fiber.

In an eighth embodiment, the present disclosure provides the fiber according to any preceding embodiment, wherein the curable resin is present in a range from 20 to 60 percent by weight, based on the total weight of the fiber.

In a ninth embodiment, the present disclosure provides the fiber according to any preceding embodiment, wherein the first thermoplastic composition and the curable resin collectively comprise at least 25 percent by weight of the fiber.

In a tenth embodiment, the present disclosure provides the fiber according to any preceding embodiment, wherein the softening temperature is not greater than 100° C.

In an eleventh embodiment, the present disclosure provides the fiber according to any preceding embodiment, wherein the first thermoplastic composition comprises at least one of an ethylene-vinyl alcohol copolymer, an at least partially neutralized ethylene-methacrylic acid or ethylene-acrylic acid copolymer, polyurethane, polyoxymethylene, polypropylene, polyolefin, ethylene-vinyl acetate copolymer, polyester, polyamide, phenoxy, vinyl, or acrylic.

In a twelfth embodiment, the present disclosure provides the fiber according to any preceding embodiment, wherein the curable resin comprises at least one of an epoxy, phenolic, acrylic, isocyanate, phenoxy, vinyl, vinyl ether, or silane.

In a thirteenth embodiment, the present disclosure provides the fiber according to the twelfth embodiment, wherein the curable resin comprises a solid epoxy resin.

In a fourteenth embodiment, the present disclosure provides the fiber according to any preceding embodiment, wherein the first thermoplastic composition comprises a curing agent.

In a fifteenth embodiment, the present disclosure provides the fiber according to any preceding embodiment, wherein the aspect ratio is at least 10:1.

In a sixteenth embodiment, the present disclosure provides the fiber according to any preceding embodiment, wherein the softening temperature of the first thermoplastic composition is within 20° C. of a cure onset temperature of the curable resin.

In a seventeenth embodiment, the present disclosure provides the fiber according to any preceding embodiment, wherein the fiber further comprises at least one surface applied surfactant or polymeric dispersing agent.

In an eighteenth embodiment, the present disclosure provides a composition comprising a plurality of fibers according to any preceding embodiment.

In a nineteenth embodiment, the present disclosure provides a composition comprising a plurality of fibers comprising:

thermoplastic fibers comprising a first thermoplastic composition having a softening temperature up to 120° C., wherein each thermoplastic fiber independently has an aspect ratio of at least 2:1 and a maximum cross-sectional dimension up to 60 micrometers; and curable fibers comprising a curable resin, wherein each curable fiber independently has an aspect ratio of at least 2:1 and a maximum cross-sectional dimension up to 60 micrometers, the thermoplastic fibers and the curable fibers each forming a portion of the plurality of fibers.

In a twentieth embodiment, the present disclosure provides the composition according to embodiment 19, wherein the softening temperature of the first thermoplastic composition is within 20° C. of a cure onset temperature of the curable resin.

In a twenty-first embodiment, the present disclosure provides the composition according to embodiment 19 or 20, wherein each thermoplastic fiber and each curable fiber has a core and a sheath surrounding the core, wherein each core independently comprises a second thermoplastic composition having a melting point of at least 140 ° C., wherein the sheath of the thermoplastic fiber comprises the first thermoplastic composition, and wherein the sheath of the curable fiber comprises the curable resin.

In a twenty-second embodiment, the present disclosure provides the composition according to any of embodiments 19 to 21, wherein the curable fibers each comprise the curable resin in a range from 20 to 60 percent by weight, based on the total weight of the respective curable fiber.

In a twenty-third embodiment, the present disclosure provides the composition according to any of embodiments 19 to 22, wherein the first thermoplastic composition comprises a curing agent.

In a twenty-fourth embodiment, the present disclosure provides the composition according to any of embodiments 19 to 23, wherein at least some of the fibers comprise at least one surface applied surfactant or polymeric dispersing agent.

In a twenty-fifth embodiment, the present disclosure provides the composition according to any of embodiments 18 to 24, wherein when a 5 percent by weight mixture of the plurality of fibers in deionized water is heated at 145° C. for four hours in an autoclave, less than 50% by volume of the plurality of fibers at least one of dissolves or disintegrates, and less than 50% by volume of the first thermoplastic composition and the curable resin at least one of dissolves or disintegrates.

In a twenty-sixth embodiment, the present disclosure provides the composition according to any of embodiments 18 to 25, wherein when a 2 percent weight to volume mixture of the plurality of fibers in kerosene is heated at 145° C. for 24 hours under nitrogen, less than 50% by volume of the plurality of fibers at least one of dissolves or disintegrates, and less than 50% by volume of the first thermoplastic composition and the curable resin at least one of dissolves or disintegrates.

In a twenty-seventh embodiment, the present disclosure provides the composition according to any of embodiments 18 to 26, further comprising a fluid, wherein the plurality of fibers is dispersed in the fluid.

In a twenty-eighth embodiment, the present disclosure provides the composition according to embodiment 27, wherein the composition further comprises proppants dispersed in the fluid.

In a twenty-ninth embodiment, the present disclosure provides a method of treating a subterranean formation, the method comprising:

injecting into a well-bore intersecting the subterranean formation the composition according to embodiment 27 or 28;

exposing the first thermoplastic composition to at least one temperature above the softening temperature; and at least partially curing the curable resin.

In a thirtieth embodiment, the present disclosure provides the method according to embodiment 29, further comprising forming a network from the plurality of fibers.

Advantages and embodiments of this disclosure are further illustrated by the following examples, but the particular materials and amounts thereof recited in these examples, as well as other conditions and details, should not be construed to unduly limit this invention. All parts and percentages are by weight unless otherwise indicated.

EXAMPLES

Softening Temperature Test

The softening temperatures of the first thermoplastic compositions for Examples 1 to 3 were determined using a stress-controlled rheometer (Model AR2000 manufactured by TA Instruments, New Castle, Del.) according to the following procedure.

The materials discussed in Examples 1 to 3 were placed between two 20 mm parallel plates of the rheometer and pressed to a gap of 2 mm ensuring complete coverage of the plates. A sinusoidal frequency of 1 Hz at 1% strain was then applied over a temperature range of 80-200° C. The resistance force of the molten resin to the sinusoidal strain was proportional to its modulus which was recorded by a transducer and displayed in graphical format. Using rheometeric software, the modulus is mathematically split into two parts: one part that was in phase with the applied strain (elastic modulus—solid-like behavior), and another part that was out of phase with the applied strain (viscous modulus—liquid-like behavior). The temperature at which the two moduli were identical (cross-over temperature) was defined as a softening point, as it represents the temperature above which the resin began to behave predominantly like a liquid.

Example 1

Thermoplastic (60 grams) obtained from Evonik, Parsippany, N.J. under the trade designation "DYNAPOL X 1158", 23 grams of epoxy resin obtained from Hexion Specialty Chemicals, Houston, Tex. under the trade designation "EPON 828", 15 grams of epoxy resin obtained from Hexion Specialty Chemicals under the trade designation "EPON 1004", and 2 grams of ($\eta^5$-cyclopentadienyl)$\eta^6$-xylenes)Fe$^+$SbF$_6^-$ (obtained from 3M Company, Maplewood, Minn., but no longer available) were mixed and extruded using a twin screw extruder at a temperature of 120° C. This mixture was extrusion coated onto a silicone release polyester film. Part of the film sample was exposed to ultraviolet light using a conveyor system from Fusion UV Systems, Inc., Gaithersburg, Md., equipped with a bulb obtained from Fusion UV Systems under the trade designation "H". The conveyor was operated at approximately 10 feet per minute. Another part of the film sample was left unexposed. A sheet of the exposed film was placed between the parallel plates of the rheometer and tested using the Softening Temperature Test, above. The minimum in elastic modulus that was observed was at about 95 ° C. In the vicinity of this temperature it is believed that curing begins, which leads to an increase in moduli. Therefore, no crossover temperature was observed, and the softening temperature was estimated to be 95° C.

Example 2

A sheath-core bicomponent fiber made from a core of nylon 6 (obtained under the trade designation "ULTRAMID B27 B01" from BASF North America, Florham Park, N.J.) and a sheath of ethylene-methacrylic acid ionomer (obtained from the E. I. duPont de Nemours & Company, Wilmington, Del. under the trade designation "SURLYN 8660") was made as described in the examples of U.S. Pat. No. 4,406,850 (Hills) (the disclosure of which is incorporated herein by reference), except with the following modifications. (a) The die was heated to a temperature of 240° C. (b) The extrusion die had sixteen orifices laid out as two rows of eight holes, wherein the distance between holes was 12.7 mm (0.50 inch) with square pitch, and the die had a transverse length of 152.4 mm (6.0 inches). (c) The hole diameter was 1.02 mm (0.040 inch), and the length to diameter ratio was 4.0. (d) The relative extrusion rates in grams per hole per minute of the sheath was 0.24 and the core 0.25. (e) The fibers were conveyed downwards a distance of 58 centimeters to a quench bath of water held at 25° C., wherein the fibers were immersed in the water for a minimum of 0.3 seconds before being dried by compressed air and wound on a core. (f) The spinning speed was adjusted by a pull roll to 250 meters/minute.

A solution containing 24.58 grams of epoxy resin obtained from Hexion Specialty Chemicals under the trade designation " EPI-REZ 3540", 10.24 grams of epoxy resin obtained from Hexion Specialty Chemicals under the trade designation "EPI-REZ 3510", 2.98 grams of a polyamine curing agent obtained from Air Products and Chemicals, Allentown, Pa. under the trade designation "ANCAMINE 2441", and 37.21 grams deionized water was mixed and coated onto the fiber using a dip coating method and oven-dried at 60° C. The individual fibers were kept separated until they were dry. The coated fiber was then cut into 6-10 mm in length and tested. The fiber had a mass ratio of 51% of the bi-component fiber and 49% of the epoxy resin coating. The coating was entirely surrounding the fiber and was uniform in thickness. A softening temperature of 90° C. was measured for the ethylene-methacrylic acid ionomer "SURLYN 8660" using the Softening Temperature test, above, by placing about 1.5 grams of resin particles between the parallel plates of the rheometer.

A portion of the cut fibers was mixed with sand obtained from Badger Mining Corp., Berlin, Wis., under the trade designation "BADGER FRAC HYDRAULIC FRACTURING SAND", 20/40 grade, at 0.86 percent by weight of sand in a flow-back cell as described above. The pack was heated to 105 ° C. for four hours before water flow was started. The pack resisted a flow rate higher than 12 liters per minute. A visual inspection of the pack indicated that the sand was networked with the fibers.

Example 3

A sheath-core bicomponent fiber made from a core of two polypropylenes in a 50/50 mixture, the polypropylenes obtained from Total, Jersey City, N.J. under the trade designations "TOTAL 3960" and "TOTAL 5571". The sheath was made from an epoxy resin obtained from Hexion Specialty Chemicals under the trade designation "EPON 1004", a thermoplastic polyurethane obtained from Huntsman, The Woodlands, Tex. under the trade designation "IROGRAN A80 P4699", a polyoxymethylene obtained from Ticona, Morristown, Tenn. under the trade designation "CELCON FG40U01", and a polyolefin obtained from ExxonMobil Chemical, Houston, Tex. under the trade designation "EXACT 8230" in a ratio of 35/20/20/25, respectively. The sheath-core fiber was made as described in Example 1 of U.S. Pat. No. 4,406,850 (Hills) (the disclosure of which is incorporated herein by reference), except with the following modifications. (a) The die was heated to a temperature of 175° C. (b) The extrusion die had sixteen orifices laid out as two rows of eight holes, wherein the distance between holes was 12.7 mm (0.50 inch) with square pitch, and the die had a transverse length of 152.4 mm (6.0 inches). (c) The hole diameter was 0.38 mm (0.015 inch) and the length to diameter ratio was 4.0. (d) The relative extrusion rates in grams per hole per minute of the sheath and core were 0.24 and 0.25, respectively. (e) The fibers were air quenched and wound on a core. (f) The spinning speed was adjusted by a pull roll to 200 meters/minute. The resulting core-sheath fiber was 40 microns in diameter. The softening temperature was measured for about 1.5 grams of a blend of the thermoplastics in the sheath and found to be 75° C.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A fiber comprising:
    a first thermoplastic composition, and
    a curable resin,
    wherein an admixture of the first thermoplastic composition and the curable resin forms at least a portion of the fiber, wherein the admixture has a softening temperature up to 120° C., wherein the fiber has an aspect ratio of at least 2:1, and wherein the fiber has a maximum cross-sectional dimension up to 60 micrometers.

2. The fiber according to claim 1, wherein the softening temperature of the first thermoplastic composition is within 20° C. of a cure onset temperature of the curable resin.

3. The fiber according to claim 1, wherein the first thermoplastic composition includes a thermoplastic with functional groups that can react with or cause the homopolymerization of the curable resin.

4. The fiber according to claim 1, wherein the first thermoplastic composition comprises at least one of an ethylene-vinyl alcohol copolymer, an at least partially neutralized ethylene-methacrylic acid or ethylene-acrylic acid copolymer, polyurethane, polyoxymethylene, polypropylene, polyolefin, ethylene-vinyl acetate copolymer, polyester, polyamide, phenoxy, vinyl, or acrylic.

5. The fiber according to claim 1, wherein the first thermoplastic composition comprises a curing agent.

6. A composition comprising a plurality of the fibers according to claim 1 and a fluid, wherein the plurality of fibers is dispersed in the fluid, and wherein the composition optionally further comprises proppants dispersed in the fluid.

7. A method of treating a subterranean formation, the method comprising:

injecting into a well-bore intersecting the subterranean formation the composition according to claim 6;

exposing the first thermoplastic composition to at least one temperature above the softening temperature; and at least partially curing the curable resin.

8. The fiber according to claim 1, wherein the curable resin comprises at least one of an epoxy, phenolic, acrylic, isocyanate, phenoxy, vinyl, vinyl ether, or silane.

9. The fiber according to claim 8, wherein the curable resin comprises a solid epoxy resin.

10. The fiber according to claim 1, comprising a core and a sheath surrounding the core, wherein the core comprises a second thermoplastic composition having a melting point of at least 140° C., and wherein the sheath comprises the first thermoplastic composition and the curable resin.

11. The fiber according to claim 10, wherein the second thermoplastic composition comprises at least one of an ethylene-vinyl alcohol copolymer, polyamide, polyoxymethylene, polypropylene, polyester, polyurethane, polysulfone, polyimide, polyetheretherketone, or polycarbonate.

12. The fiber according to claim 10, wherein the first thermoplastic composition comprises at least one of an ethylene-vinyl alcohol copolymer, an at least partially neutralized ethylene-methacrylic acid or ethylene-acrylic acid copolymer, polyurethane, polyoxymethylene, polypropylene, polyolefin, ethylene-vinyl acetate copolymer, polyester, polyamide, phenoxy, vinyl, or acrylic.

13. The fiber according to claim 10, wherein the first thermoplastic composition comprises a curing agent.

14. The fiber according to claim 10, wherein the curable resin comprises at least one of an epoxy, phenolic, acrylic, isocyanate, phenoxy, vinyl, vinyl ether, or silane.

15. The fiber according to claim 14, wherein the curable resin comprises a solid epoxy resin.

16. A composition comprising a plurality of the fibers according to claim 10.

17. The composition according to claim 16, wherein at least some of the fibers comprise at least one surface applied surfactant or polymeric dispersing agent.

18. The composition according to claim 16, further having at least one of the following features:

wherein when a 5 percent by weight mixture of the plurality of fibers in deionized water is heated at 145° C. for four hours in an autoclave, less than 50% by volume of the plurality of fibers at least one of dissolves or disintegrates, and less than 50% by volume of the first thermoplastic composition and the curable resin at least one of dissolves or disintegrates; or wherein when a 2 percent weight to volume mixture of the plurality of fibers in kerosene is heated at 145° C. for 24 hours under nitrogen, less than 50% by volume of the plurality of fibers at least one of dissolves or disintegrates, and less than 50% by volume of the first thermoplastic composition and the curable resin at least one of dissolves or disintegrates.

19. The composition according to claim 16, further comprising a fluid, wherein the plurality of fibers is dispersed in the fluid, and wherein the composition optionally further comprises proppants dispersed in the fluid.

20. A method of treating a subterranean formation, the method comprising:

injecting into a well-bore intersecting the subterranean formation the composition according to claim 19;

exposing the first thermoplastic composition to at least one temperature above the softening temperature; and at least partially curing the curable resin.

\* \* \* \* \*